United States Patent Office 3,428,901
Patented Feb. 18, 1969

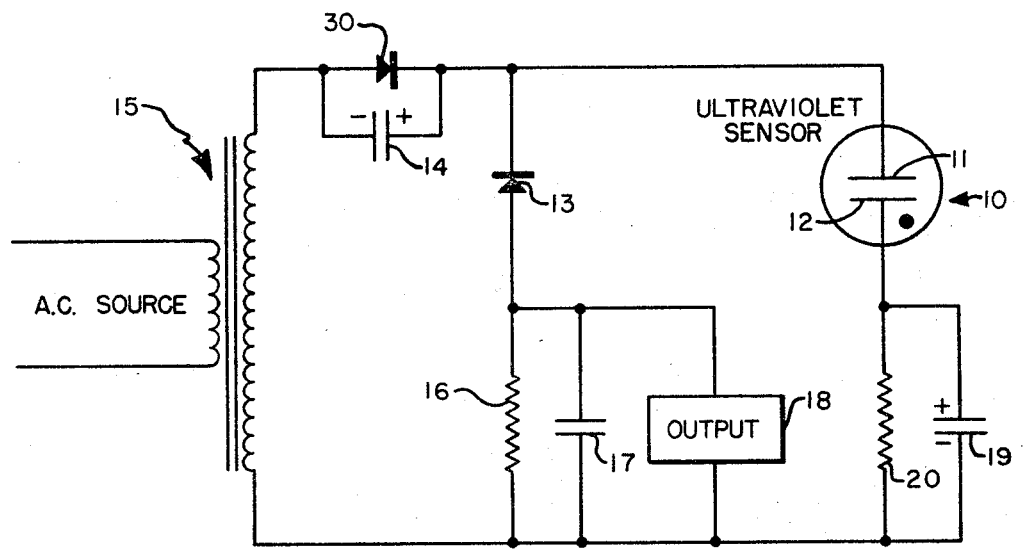

3,428,901
CONDITION DETECTING APPARATUS, INCLUDING CAPACITOR IN SERIES WITH SENSOR MEANS, FOR SHORT CIRCUIT PROTECTION
James C. Blackett, Rosemount, Minn., assignor to Honeywell Inc., Minneapolis, Minn., a corporation of Delaware
Filed Aug. 22, 1966, Ser. No. 573,892
U.S. Cl. 328—1                    9 Claims
Int. Cl. G08b 21/00

My invention is concerned with an improved condition detecting apparatus constructed and arranged to provide a safe-failure upon accidental short circuit of a variable impedance type condition sensor.

I disclose a condition detecting apparatus utilizing an ultra-violet radiation sensor of the Geiger-tube type. Such a sensor is generally characterized as having a pair of electrodes disposed in an ionizable gaseous medium and adapted to be connected to a source of operating voltage, such that UV radiation causes an electron to be produced. This electron passes through the gas causing ionization and a current discharge to flow through the sensor. This sensor has a high impedance, approaching infinity, in the absence of radiation. In the presence of radiation the sensor conducts current as determined by the value of the circuit elements. In an embodiment of my invention, the equivalent average impedance of the sensor when exposed to UV radiation was below 50,000 ohms—but substantially higher than zero impedance, the effective impedance of the sensor if it is accidentally shorted.

The structure of my invention provides a capacitor in series with the sensor to be charged by the sensor current. When radiation is present, this capacitor is normally charged to a relatively low voltage due to the impedance of the sensor. However, upon accidental short circuit of the sensor this capacitor is charged to a relatively high voltage due to the very low impedance of the short circuit. In the short-circuit condition, the high voltage of this capacitor is connected to back-bias a diode and to interrupt current flow through the diode. This interruption of current flow is effective to interrupt an output which is indicative of presence of radiation. Thus, a short circuit of the UV sensor results in safe failure.

The single figure discloses a preferred embodiment of my invention, wherein reference numeral 10 designates a UV sensor which may be of the type shown in the Robert O. Engh et al. patent application, Ser. No. 402,785, filed Oct. 9, 1964, now Patent No. 3,344,302. While this sensor is capable of conducting current in either, or both, directions, the associated circuitry allows current to flow only from anode 11 to cathode 12.

UV sensor 10 includes a first electrode 11 which functions as an anode and a second electrode 12 which functions as a cathode. Upon sensor 10 being subjected to ultra-violet radiation, a pulse of current flows from the anode to the cathode.

Operating voltage for sensor 10 is derived from a voltage doubler network which includes the secondary winding of transformer 15, a first diode 13, and a first capacitor 14. When the lower terminal of the secondary is positive, current flows through a parallel network which increases resistor 16 and capacitor 17, and through diode 13 to charge capacitor 14 to the polarity indicated. On the next half cycle of the AC source, the secondary AC voltage is connected to aid the DC voltage on capacitor 14 and to apply a positive voltage to anode 11 of the sensor.

The DC voltage of capacitor 14 forms a pedestal on which the AC voltage is added to give a voltage doubling effect, the resultant voltage being greater than the firing voltage of sensor 10.

In an embodiment of my invention, secondary winding had a magnitude of 136 volts, capacitor 14 was 4 microfarads, resistor 16 was 5,100 ohms and capacitor 17 was 10 microfarads. The DC voltage of capacitor 14 was 110 volts.

If sensor 10 now experiences UV radiation, capacitor 14 suddenly discharges through the sensor and a parallel network consisting of resistor 20 and capacitor 19. Capacitor 14 provides a quantity of electrical energy to insure complete ionization of the area between electrodes 11 and 12 for each pulse of current which passes through the sensor.

On the next half cycle diode 13 conducts current through network 16–17 to recharge capacitor 14. Also, during this half cycle the voltage across sensor 10 drops to a low value (the sum of the voltage across diode 13, network 16–17 and network 19–20). This value is below the extinction voltage of sensor 10 and the gas discharge of the sensor is quenched.

In the embodiment of my invention above mentioned, capacitor 19 was 10 microfarads, resistor 20 was 5,100 ohms and sensor 10 had a firing voltage of 240 volts and an extinction voltage of 185 volts. The average DC current carried by sensor 10 to network 19–20 was 7 milliamps when the sensor was operating in a saturated condition. Capacitor 19 was then charged to 40 volts.

Network 16–17 integrates the current which flows to charge capacitor 14. When sensor 10 is subjected to ultra-violet radiation, capacitor 14 is alternately charged and discharged at a frequent rate. As a result, capacitor 17 charges to a relatively high voltage and an output is provided at 18. For the random and infrequent background current pulses which appear in the absence of radiation, capacitor 17 is charged to a low voltage and 18 does not provide an output.

So long as UV radiation is present, sensor 10 is quenched and capacitor 14 is charged during one-half cycle, and sensor 10 is ionized and capacitor 14 is discharged during the next half cycle.

Short circuit protection is provided by network 19–20 and diode 30. When sensor 10 is accidentally shorted, capacitor 19 charges through diode 30, the polarity of the charge being as shown. The charge now existing on capacitor 19 is greater than when sensor 10 assumes its low impedance state indicative of UV radiation. During the next half cycle of the AC source, the secondary voltage of transformer 15 is a forward bias for diode 13, tending to cause current to flow to charge capacitor 14, as described. However, the voltage on capacitor 19 tends to back-bias diode 13 and negligible current flows through network 16–17. So long as sensor 10 is shorted, an equilibrium is established whereby an output does not appear at 18.

The presence of network 19–20 prevents an output from appearing at 18 when sensor 10 is shorted, and at the same time, the power drawn from source 15 is limited to a safe value. Without network 19–20, a short of sensor 10 would short circuit 13 and 16 and apply the full secondary voltage to circuit 14 and 30, resulting in damage of the circuit elements.

I claim as my invention:
1. Condition detecting apparatus comprising:
   first circuit means adapted to be connected to a source of AC voltage and including in a series circuit first electrical energy storage means, first unidirectionally conductive means, and output means,
   second unidirectionally conductive means connected in parallel with said first storage means, said second unidirectionally conductive means being poled to pass current in a direction opposite to said first unidirectionally conductive means,
   variable impedance condition sensing means having a high impedance in the absence of a condition to which it is sensitive and having a low impedance when subjected to said condition,
and second circuit means connected in parallel with said series connected first unidirectionally conductive means and output means, said second circuit means including in a series circuit said condition sensing means and second electrical energy storage means.

2. Apparatus as defined in claim 1 wherein said first and second unidirectionally conductive means are diodes.

3. Apparatus as defined in claim 1 wherein said first and second electrical energy storage means are capacitors.

4. Apparatus as defined in claim 3 wherein said output means includes current integrating means.

5. Apparatus as defined in claim 4 wherein said current integrating means includes a capacitor having a high capacitance value as compared to said first capacitor.

6. Apparatus as defined in claim 3 wherein said output means is constructed to be current sensitive, and said first diode charges said first capacitor so long as said condition sensing means is of the low impedance, to thereby provide a current flow to said output means.

7. Apparatus as defined in claim 1 wherein said condition sensing means conducts current in the same direction as said second unidirectionally conductive means in the presence of the condition.

8. Apparatus as defined in claim 6 wherein said condition sensing means conducts current in the same direction as said second diode in the presence of the condition, and wherein a short-circuit of said sensing means causes said second capacitor to be charged to tend to back-bias said first diode to interrupt current flow to said output means.

9. Apparatus as defined in claim 3 wherein said first diode charges said first capacitor during first half-cycles of the AC voltage such that the charge of said first capacitor aids the AC voltage on alternate half-cycles and is discharged through said condition sensing means to charge said second capacitor to a value determined by said low impedance of said sensing means in the presence of the condition, to thereby provide a current flow to said output means during said first-half cycles; and wherein a short-circuit of said sensing means causes said second capacitor to be charged by said second diode to tend to back-bias said first diode and interrupt the current flow to said output means.

References Cited

UNITED STATES PATENTS

| 3,002,094 | 9/1961 | Kompelien | 250—83.6 |
| 3,047,722 | 7/1962 | Pinckagrs | 250—83.6 |
| 3,336,479 | 8/1967 | Blackett | 250—83.6 |
| 3,342,995 | 9/1967 | Axmark | 250—83.6 |

ARTHUR GAUSS, *Primary Examiner.*

S. D. MILLER, *Assistant Examiner.*

U.S. Cl. X.R.

328—6; 307—308; 250—83.6